United States Patent
Eddy et al.

(10) Patent No.: US 8,301,842 B2
(45) Date of Patent: Oct. 30, 2012

(54) EFFICIENT PSEUDO-LRU FOR COLLIDING ACCESSES

(75) Inventors: Colin Eddy, Austin, TX (US); Rodney E. Hooker, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 379 days.

(21) Appl. No.: 12/830,588

(22) Filed: Jul. 6, 2010

(65) Prior Publication Data

US 2011/0055485 A1    Mar. 3, 2011

Related U.S. Application Data

(60) Provisional application No. 61/236,951, filed on Aug. 26, 2009.

(51) Int. Cl.
*G06F 12/00* (2006.01)
(52) U.S. Cl. .. 711/136; 711/134; 711/120; 711/E12.022
(58) Field of Classification Search .................. None
See application file for complete search history.

(56) References Cited

U.S. PATENT DOCUMENTS

| 5,325,504 | A | 6/1994 | Tipley et al. |
| 5,781,924 | A | 7/1998 | Zaitzeva et al. |
| 6,078,995 | A | 6/2000 | Bewick et al. |
| 6,138,211 | A | 10/2000 | Ahn et al. |
| 6,643,742 | B1 | 11/2003 | Vidwans et al. |
| 2009/0113137 | A1* | 4/2009 | Grayson et al. ............. 711/136 |

* cited by examiner

*Primary Examiner* — Yaima Campos
*Assistant Examiner* — Thanh D Vo
(74) *Attorney, Agent, or Firm* — E. Alan Davis; James W. Huffman

(57) ABSTRACT

An apparatus for allocating entries in a set associative cache memory includes an array that provides a first pseudo-least-recently-used (PLRU) vector in response to a first allocation request from a first functional unit. The first PLRU vector specifies a first entry from a set of the cache memory specified by the first allocation request. The first vector is a tree of bits comprising a plurality of levels. Toggling logic receives the first vector and toggles predetermined bits thereof to generate a second PLRU vector in response to a second allocation request from a second functional unit generated concurrently with the first allocation request and specifying the same set of the cache memory specified by the first allocation request. The second vector specifies a second entry different from the first entry from the same set. The predetermined bits comprise bits of a predetermined one of the levels of the tree.

20 Claims, 5 Drawing Sheets

EXAMPLE: TOGGLE AT LEVEL 1

| ACTION | STEP | VECTOR VALUE | WAY |
|---|---|---|---|
| VECTOR 212 PROVIDED TO ACCESS ONE | STEP 304 | 0101010 | WAY 2 |
| VECTOR 214 PROVIDED TO ACCESS TWO | STEP 308 | 0101100 | WAY 1 |
| NEW VECTOR 216 | STEP 312 | 0100111 | WAY 6 |

EXAMPLE: TOGGLE AT LEVEL 2

| ACTION | STEP | VECTOR VALUE | WAY |
|---|---|---|---|
| VECTOR 212 PROVIDED TO ACCESS ONE | STEP 304 | 0101010 | WAY 2 |
| VECTOR 214 PROVIDED TO ACCESS TWO | STEP 308 | 1010010 | WAY 3 |
| NEW VECTOR 216 | STEP 312 | 1000001 | WAY 4 |

FIG. 5

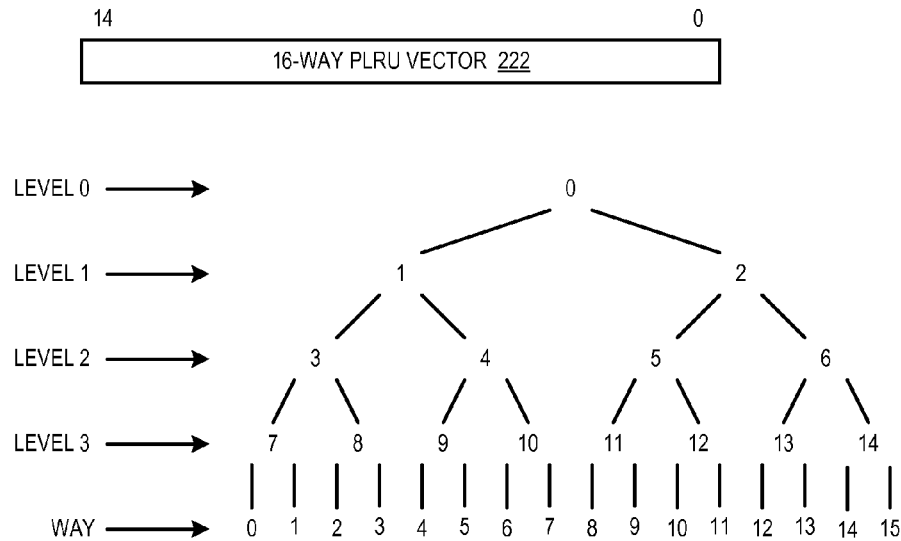

EXAMPLE: TOGGLE AT LEVEL 1

| ACTION | STEP | VECTOR VALUE | WAY |
|---|---|---|---|
| VECTOR 212 PROVIDED TO ACCESS ONE | STEP 304 | 010101010101010 | WAY 5 |
| VECTOR 214 PROVIDED TO ACCESS TWO | STEP 308 | 010101010101100 | WAY 2 |
| NEW VECTOR 216 | STEP 312 | 010101110100111 | WAY 13 |

EXAMPLE: TOGGLE AT LEVEL 2

| ACTION | STEP | VECTOR VALUE | WAY |
|---|---|---|---|
| VECTOR 212 PROVIDED TO ACCESS ONE | STEP 304 | 010101010101010 | WAY 5 |
| VECTOR 214 PROVIDED TO ACCESS TWO | STEP 308 | 010101011010010 | WAY 6 |
| NEW VECTOR 216 | STEP 312 | 010111011000001 | WAY 9 |

EXAMPLE: TOGGLE AT LEVEL 3

| ACTION | STEP | VECTOR VALUE | WAY |
|---|---|---|---|
| VECTOR 212 PROVIDED TO ACCESS ONE | STEP 304 | 010101010101010 | WAY 5 |
| VECTOR 214 PROVIDED TO ACCESS TWO | STEP 308 | 101010100101010 | WAY 4 |
| NEW VECTOR 216 | STEP 312 | 101011100111001 | WAY 11 |

EFFICIENT PSEUDO-LRU FOR COLLIDING ACCESSES

CROSS REFERENCE TO RELATED APPLICATION(S)

This application claims priority based on U.S. Provisional Application Ser. No. 61/236,951, filed Aug. 26, 2009, entitled EFFICIENT PSEUDO-LRU FOR COLLIDING ACCESSES, which is hereby incorporated by reference in its entirety.

FIELD OF THE INVENTION

The present invention relates in general to the field of cache memories, and particularly to the allocation of entries therein.

BACKGROUND OF THE INVENTION

When a unit (e.g., load unit or store unit) misses in a set associative cache, it allocates an entry from one of the ways of the selected set in the cache. The cache allocates the way indicated by a vector that indicates a replacement scheme, which is commonly a pseudo-LRU (PLRU) vector. The cache must update the PLRU vector or else next time it performs an allocation, it will allocate the same way. Sometimes two units (e.g., load unit and store unit) miss in the cache and initiate allocations at the same time. Three problems must be solved in this case. First, it is desirable to ensure that the same way is not allocated to both units or else one will immediately kick out the other that was just allocated, which is not beneficial to performance. Second, to avoid degrading performance, it is beneficial to update the PLRU in such a way that either of the newly allocated ways is not soon allocated. Third, it is desirable to solve the first two problems with logic that does so as quickly as possible in order to avoid creating a timing problem with the solution.

BRIEF SUMMARY OF INVENTION

In one aspect the present invention provides an apparatus for allocating entries in a set associative cache memory. The apparatus includes an array configured to provide a first pseudo-least-recently-used (PLRU) vector in response to a first allocation request from a first functional unit. The first PLRU vector specifies a first entry from a set of the cache memory specified by the first allocation request. The first PLRU vector is a tree of bits comprising a plurality of levels. The apparatus also includes toggling logic configured to receive the first PLRU vector and to toggle predetermined bits thereof to generate a second PLRU vector in response to a second allocation request from a second functional unit generated concurrently with the first allocation request and specifying the same set of the cache memory specified by the first allocation request. The second PLRU vector specifies a second entry different from the first entry from the same set. The predetermined bits comprise bits of a predetermined one of the plurality of levels of the tree.

In another aspect, the present invention provides a method for allocating entries in a set associative cache memory. The method includes providing a first pseudo-least-recently-used (PLRU) vector from an array of the cache memory, in response to a first functional unit requesting allocation of an entry from a set of the cache memory. The first PLRU vector is a tree of bits comprising a plurality of levels. The method also includes toggling predetermined bits of the first PLRU vector to generate a second PLRU vector, in response to a second functional unit concurrently requesting allocation of an entry from the same set of the cache memory. The predetermined bits comprise bits of a predetermined one of the plurality of levels of the tree.

In yet another aspect, the present invention provides a computer program product encoded in at least one computer readable medium for use with a computing device, the computer program product comprising computer readable program code embodied in said medium for specifying an apparatus for allocating entries in a set associative cache memory. The computer readable program code includes first program code for specifying an array configured to provide a first pseudo-least-recently-used (PLRU) vector in response to a first allocation request from a first functional unit. The first PLRU vector specifies a first entry from a set of the cache memory specified by the first allocation request. The first PLRU vector is a tree of bits comprising a plurality of levels. The computer readable program code also includes second program code for specifying toggling logic, configured to receive the first PLRU vector and to toggle predetermined bits thereof to generate a second PLRU vector, in response to a second allocation request from a second functional unit generated concurrently with the first allocation request and specifying the same set of the cache memory specified by the first allocation request. The second PLRU vector specifies a second entry different from the first entry from the same set, wherein the predetermined bits comprise bits of a predetermined one of the plurality of levels of the tree.

BRIEF DESCRIPTION OF THE DRAWINGS

FIGS. 4 and 5 are examples of the operation of the data cache of FIG. 2 according to the flowchart of FIG. 3.

DETAILED DESCRIPTION OF THE INVENTION

Embodiments of a cache memory are described herein that allocates to the first of two functional units the way indicated by the current PLRU vector; it also toggles the vector bits on a low level of the PLRU tree and allocates to the second unit the way indicated by the toggled vector; it also generates the new PLRU vector based on the toggled vector, which is very fast and is scalable to a design that includes a large number of ways.

Figure 1:
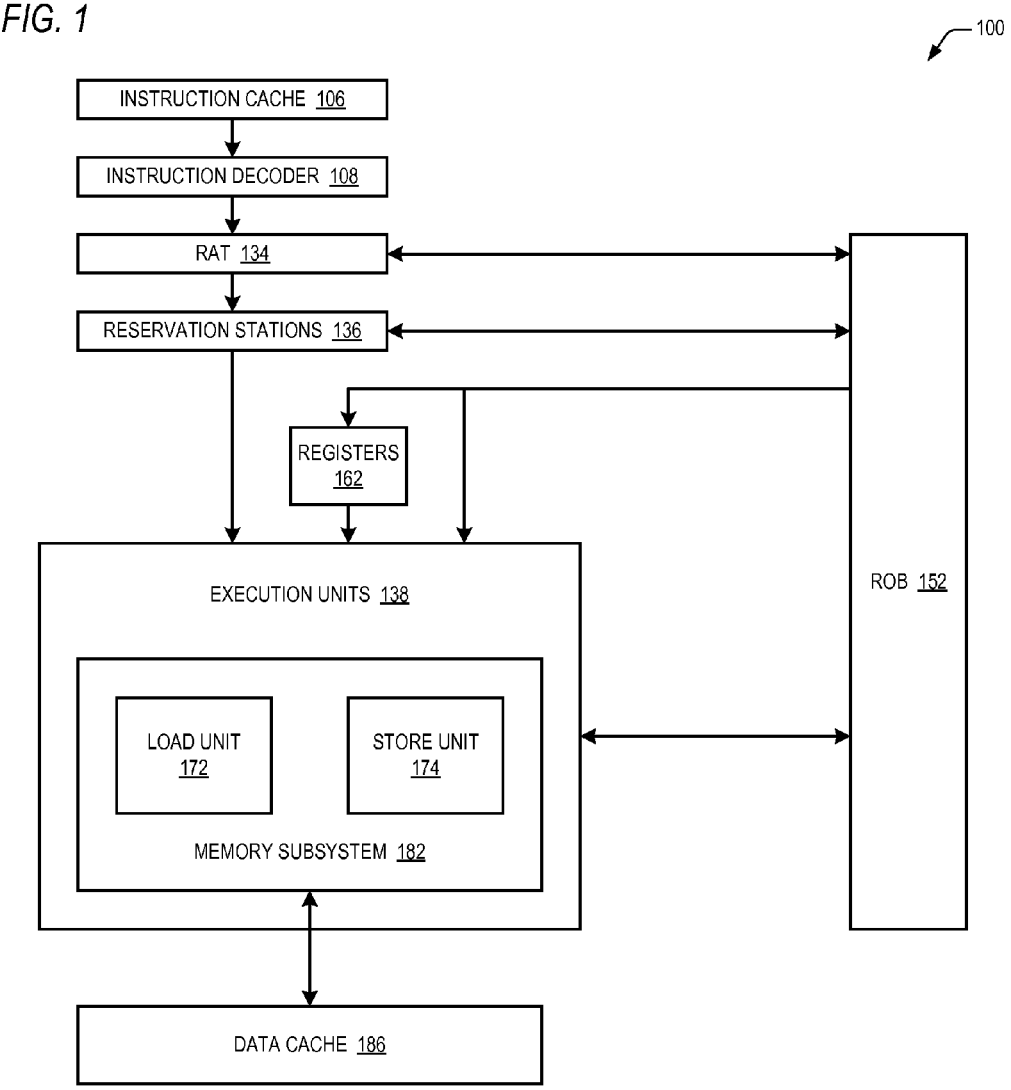
FIG. 1 is a block diagram illustrating a microprocessor.

Referring now to FIG. 1, a block diagram illustrating a microprocessor 100 is shown. The microprocessor 100 includes an instruction cache 102, instruction decode 108, register alias table (RAT) 134, reservation stations 136, register sets 162, reorder buffer (ROB) 152, and execution units 138 similar to those well-known in the art of microprocessor design. The execution units 138 include a memory subsystem 182 that includes a load unit 172 and store unit 174 that respectively load data from and store data to memory. Specifically, the load unit 172 and store unit 174 access a data cache 186 of the microprocessor 100. Advantageously, the data cache 186 employs a fast and efficient PLRU scheme for dealing with conflicting attempts by the load unit 172 and store unit 174 to allocate a cache entry in the same set, as discussed in detail below.

Figure 2:
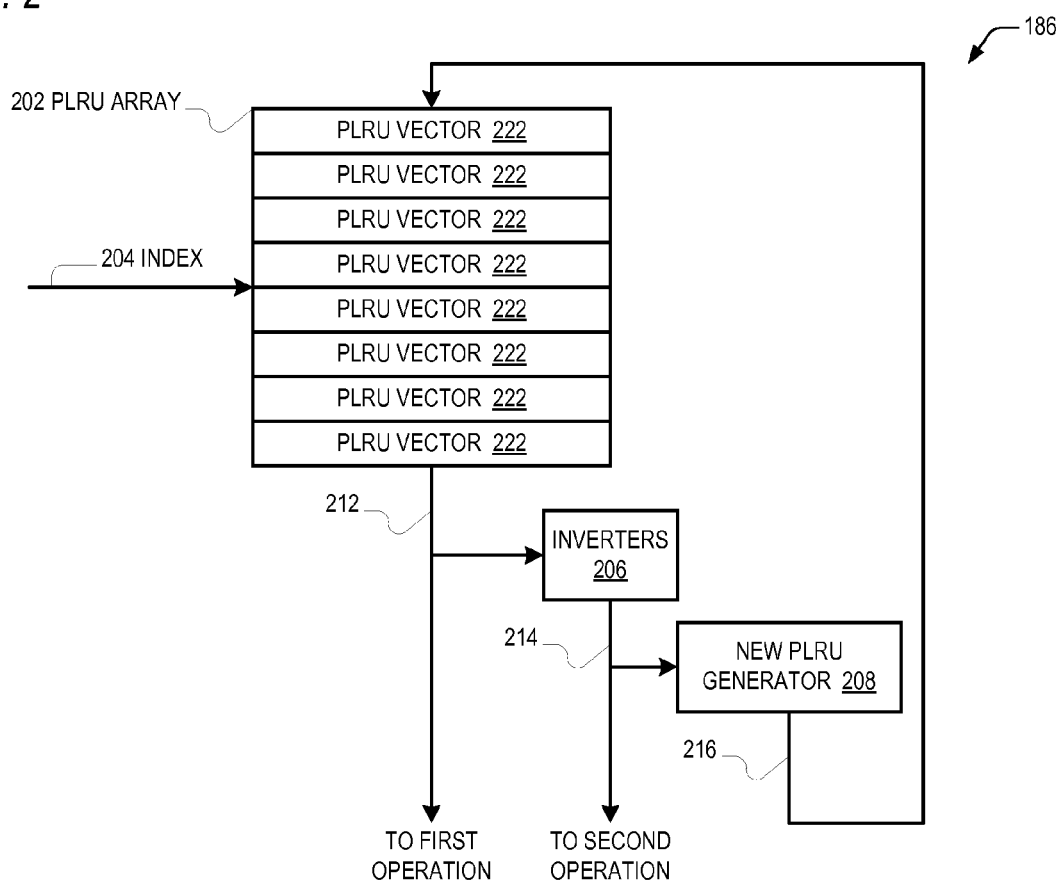
FIG. 2 is a block diagram illustrating the data cache of the microprocessor of FIG. 1.

Referring now to FIG. 2, a block diagram illustrating the data cache 186 of the microprocessor 100 of FIG. 1 is shown. The data cache 186 includes a PLRU array 202 that includes an array of PLRU vectors 222. In one embodiment, the PLRU array 202 may be incorporated into the tag array (not shown) of the data cache 186, which stores address tag and/or cache line status (e.g., MESI state) information. The data cache 186 also includes a data array (not shown) that stores the actual cache line data. Each of the tag array and data array are set-associative. That is, they each have a plurality of ways, such as is well-known in the art of cache memory design.

When the PLRU array 202 is accessed, one of the PLRU vectors 222 is selected by an index input 204, which comprises lower bits of the memory address specified by the operation (e.g., load or store) accessing the data cache 186. In the case of concurrent load and store operations to the same set that both miss in the cache and want to allocate an entry in the data cache 186, the index value 204 is the same. The PLRU array 202 outputs the selected PLRU vector 222 on output 212 to the first of the two operations.

The data cache 186 also includes a set of inverters 206 that receive the PLRU array 202 output 212 and invert a portion of the bits of the vector 212 to generate a second PLRU vector 214 which is provided to the second of the two operations. The inverted bits are all the bits of the first vector 212 that are in the same level of the PLRU tree (see FIGS. 4 and 5). The different levels chosen produce differing effects on the PLRU replacement scheme and the designer may choose the particular level to obtain the desired characteristics. It is noted that inverting the lowest level requires the largest number of inverters 206, but tends to produce the closest to truly least recently used characteristics. In one embodiment, the first vector 212 is provided to the load unit 172 and the second vector 214 is provided to the store unit 174.

Although only a single index 204 is shown in FIG. 2, it is noted that the load unit 172 and the store unit 174 each has its own index input 204, and a comparator (not shown) compares the two indexes 204 to detect the condition in which they are equal during concurrent load and store operations. Additionally, although only a single output 212 from the PLRU array 202 is shown, it is noted that the PLRU array 202 includes a first output 212 that provides the PLRU vector 222 selected by the load unit 172 index 204 input and a second output 212 that provides the PLRU vector 222 selected by the store unit 174 index 204 input. The first output 212 is always provided to the load unit 172. The second output 212 is provided to the store unit 174 when the load unit 172 index 204 and store unit 174 index 204 do not match; however, when the load unit 172 index 204 and store unit 174 index 204 match, then the output 214 of the inverters 206 is provided to the store unit 174.

The data cache 186 also includes a new PLRU generator 208. The new PLRU generator 208 receives the second vector 214 and generates a new PLRU vector 216 that is used to update the selected PLRU vector 222 in the PLRU array 202. The new PLRU generator 208 generates the new PLRU vector 216 according to the well-known PLRU generation scheme, namely by toggling each bit in the PLRU tree visited in order to reach the specified leaf, or way, of the tree. It is noted that choosing level 0 to invert produces a potentially undesirable new PLRU vector 216 because the new PLRU vector 216 points to the same way as the first vector 212, which may result in an almost immediate allocation of the same way that was just allocated to the first operation. Although only a single new PLRU generator 208 is shown in FIG. 2, it is noted that the data cache 186 also includes a second new PLRU generator 208. Normally, the first new PLRU generator 208 receives the output 212 provided to the load unit 172 and the output 216 of the first new PLRU generator 208 is used to update the PLRU vector 222 in the PLRU array 202 selected by the load unit 172 index 204; and the second new PLRU generator 208 receives the output 212 provided to the store unit 174 and the output 216 of the second new PLRU generator 208 is used to update the PLRU vector 222 in the PLRU array 202 selected by the store unit 174 index 204. However, when the load unit 172 index 204 and store unit 174 index 204 match, then the output 214 of the inverters 206 is provided to the second new PLRU generator 208 (as shown) and the output 216 of the second new PLRU generator 208 is used to update the same PLRU vector 222 in the PLRU array 202 selected by both the load unit 172 and store unit 174 index 204.

Figure 3:
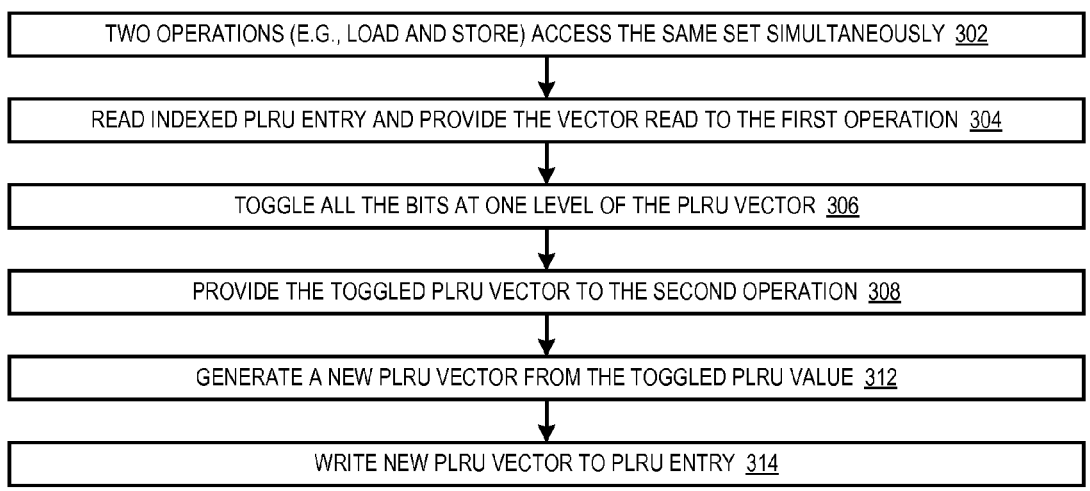
FIG. 3 is a flowchart illustrating operation of the data cache of FIG. 2.

Referring now to FIG. 3, a flowchart illustrating operation of the data cache 186 of FIG. 2 is shown. Flow begins at block 302.

At block 302, two operations (e.g., load and store operation) access the same set in the data cache 186 simultaneously, i.e., they specify the same index 204 value. Flow proceeds to block 304.

At block 304, the PLRU array 202 outputs 212 the selected PLRU vector 222 and provides the selected vector 212, or first vector 212, to the first operation. Flow proceeds to block 306.

At block 306, the inverters 206 toggle all the bits at one level of the first PLRU vector 212 tree. Flow proceeds to block 308.

At block 308, the inverters 206 provide the second vector 214 to the second operation. Flow proceeds to block 312.

At block 312, the new PLRU generator 208 generates the new PLRU vector 216 from the second vector 214 value. Flow proceeds to block 314.

At block 314, the data cache 186 writes the new PLRU vector 216 to the PLRU vector 222 of the PLRU array 202 that was selected by the index 204. Flow ends at block 314.

Figure 4:
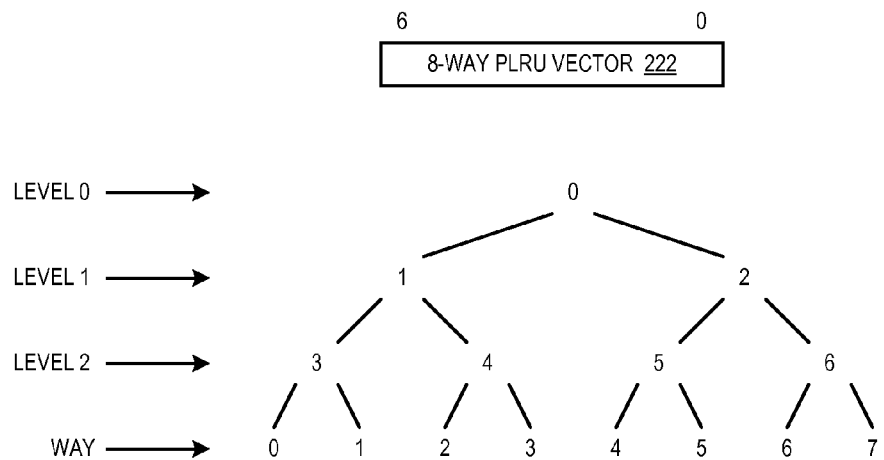

Referring now to FIG. 4, an example of the operation of the data cache 186 of FIG. 2 according to the flowchart of FIG. 3 is shown. In the example of FIG. 4, the data cache 186 is an 8-way set associative cache; therefore, each PLRU vector 222 is 7 bits, as shown. Also shown is a PLRU tree for an 8-way PLRU vector 222, as is well-known. Specifically, node 0 is at level 0; nodes 1 and 2 are at level 1; and nodes 3 through 6 are at level 2. FIG. 4 shows a first example in which the inverters 206 toggle the bits at level 1 of the PLRU tree and a second example in which the inverters 206 toggle the bits at level 2 of the PLRU tree.

Referring now to FIG. 5, an example of the operation of the data cache 186 of FIG. 2 according to the flowchart of FIG. 3 is shown. In the example of FIG. 5, the data cache 186 is a 16-way set associative cache; therefore, each PLRU vector 222 is 15 bits, as shown. Also shown is a PLRU tree for an 16-way PLRU vector 222, as is well-known. Specifically, node 0 is at level 0; nodes 1 and 2 are at level 1; nodes 3 through 6 are at level 2; and nodes 7 through 14 are at level 3. FIG. 5 shows a first example in which the inverters 206 toggle the bits at level 1 of the PLRU tree, a second example in which the inverters 206 toggle the bits at level 2 of the PLRU tree, and a third example in which the inverters 206 toggle the bits at level 3 of the PLRU tree.

Although embodiment are shown for an 8-way cache in which a 3-level, 7-bit PLRU vector is employed and a 16-way cache in which a 4-level, 15-bit PLRU vector is employed, other embodiments are contemplated with different numbers of ways (e.g., 4 or 32) and different levels (e.g., 2 or 5). As may be observed, advantageously the circuitry required to perform the PLRU scheme described herein is fast, i.e., unlikely to introduce timing problems, and scalable to a large PLRU vector to accommodate a cache design having many ways.

Furthermore, although embodiments are described with respect to a data cache 186, the PLRU scheme may be used in instruction caches, unified caches, branch target address caches, or any caches that have multiple requestors requesting to allocate a cache entry concurrently. Furthermore, although embodiments are described with respect to cache memories, the PLRU scheme may be employed in other applications in which an allocation scheme is needed for a resource having multiple requestors.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. An apparatus for allocating entries in a set associative cache memory, the apparatus comprising:
   an array, configured to provide a first pseudo-least-recently-used (PLRU) vector in response to a first allocation request from a first functional unit, wherein the first PLRU vector specifies a first entry from a set of the cache memory specified by the first allocation request, wherein the first PLRU vector is a tree of bits comprising a plurality of levels; and
   toggling logic, configured to receive the first PLRU vector and to toggle predetermined bits thereof to generate a second PLRU vector in response to a second allocation request from a second functional unit generated concurrently with the first allocation request and specifying the same set of the cache memory specified by the first allocation request, wherein the second PLRU vector specifies a second entry different from the first entry from the same set, wherein the predetermined bits comprise bits of a predetermined one of the plurality of levels of the tree.

2. The microprocessor of claim 1, wherein the first PLRU vector specifies a first entry of the set, wherein the second PLRU vector specifies a second entry of the set distinct from the first entry.

3. The microprocessor of claim 1, wherein the toggled predetermined bits comprise all bits of a predetermined one of the plurality of levels of the tree.

4. The microprocessor of claim 1, wherein the predetermined one of the plurality of levels is not the highest level of the tree.

5. The microprocessor of claim 1, wherein the predetermined one of the plurality of levels of the tree is the lowest level of the tree.

6. The microprocessor of claim 1, wherein the cache memory is 8-way set associative, wherein the tree of bits comprises three levels, wherein the predetermined one of the plurality of levels of the tree is a second level of the tree.

7. The microprocessor of claim 1, wherein the cache memory is 16-way set associative, wherein the tree of bits comprises four levels, wherein the predetermined one of the plurality of levels of the tree is a second level of the tree.

8. The microprocessor of claim 1, wherein the cache memory is 16-way set associative, wherein the tree of bits comprises four levels, wherein the predetermined one of the plurality of levels of the tree is a third level of the tree.

9. The microprocessor of claim 1, further comprising:
   a PLRU vector generator, configured to generate a new PLRU vector based on the second PLRU vector having the toggled predetermined bits and configured to update the array with the new PLRU vector.

10. A method for allocating entries in a set associative cache memory, the method comprising:
    providing a first pseudo-least-recently-used (PLRU) vector from an array of the cache memory in response to a first functional unit requesting allocation of an entry from a set of the cache memory, wherein the first PLRU vector is a tree of bits comprising a plurality of levels; and
    toggling predetermined bits of the first PLRU vector to generate a second PLRU vector in response to a second functional unit concurrently requesting allocation of an entry from the same set of the cache memory, wherein the predetermined bits comprise bits of a predetermined one of the plurality of levels of the tree.

11. The method of claim 10, wherein the first PLRU vector specifies a first entry of the set, wherein the second PLRU vector specifies a second entry of the set distinct from the first entry.

12. The method of claim 10, wherein the toggled predetermined bits comprise all bits of a predetermined one of the plurality of levels of the tree.

13. The method of claim 10, wherein the predetermined one of the plurality of levels is not the highest level of the tree.

14. The method of claim 10, wherein the predetermined one of the plurality of levels of the tree is the lowest level of the tree.

15. The method of claim 10, wherein the cache memory is 8-way set associative, wherein the tree of bits comprises three levels, wherein the predetermined one of the plurality of levels of the tree is a second level of the tree.

16. The method of claim 10, wherein the cache memory is 16-way set associative, wherein the tree of bits comprises four levels, wherein the predetermined one of the plurality of levels of the tree is a second level of the tree.

17. The method of claim 10, wherein the cache memory is 16-way set associative, wherein the tree of bits comprises four levels, wherein the predetermined one of the plurality of levels of the tree is a third level of the tree.

18. The method of claim 10, further comprising:
generating a new PLRU vector based on the second PLRU vector having the toggled predetermined bits; and
updating the array with the new PLRU vector.

19. A computer program product encoded in at least one non-transitory computer readable medium for use with a computing device, the computer program product comprising:
computer readable program code embodied in said medium, for specifying an apparatus for allocating entries in a set associative cache memory, the computer readable program code comprising: first program code for specifying an array, configured to provide a first pseudo-least-recently-used (PLRU) vector in response to a first allocation request from a first functional unit, wherein the first PLRU vector specifies a first entry from a set of the cache memory specified by the first allocation request, wherein the first PLRU vector is a tree of bits comprising a plurality of levels; and
second program code for specifying toggling logic, configured to receive the first PLRU vector and to toggle predetermined bits thereof to generate a second PLRU vector in response to a second allocation request from a second functional unit generated concurrently with the first allocation request and specifying the same set of the cache memory specified by the first allocation request, wherein the second PLRU vector specifies a second entry different from the first entry from the same set, wherein the predetermined bits comprise bits of a predetermined one of the plurality of levels of the tree.

20. The computer program product of claim 19, wherein the at least one non-transitory computer readable medium is selected from the set of a disk, tape, or other magnetic, optical, or electronic storage medium and a wire line communications medium.

* * * * *